US007621630B2

(12) United States Patent
Ito et al.

(10) Patent No.: US 7,621,630 B2
(45) Date of Patent: Nov. 24, 2009

(54) INK SET AND INK JET RECORDING METHOD

(75) Inventors: Hiroshi Ito, Nagano-Ken (JP); Yoshiyuki Ozawa, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/998,996

(22) Filed: Dec. 3, 2007

(65) Prior Publication Data

US 2008/0254265 A1    Oct. 16, 2008

Related U.S. Application Data

(63) Continuation of application No. 10/858,556, filed on Jun. 1, 2004, now abandoned.

(30) Foreign Application Priority Data

Jun. 2, 2003   (JP)   ............................. 2003-157126
Mar. 8, 2004   (JP)   ............................. 2004-064388

(51) Int. Cl.
    *C09D 11/00*   (2006.01)
(52) U.S. Cl. .................................... 347/100; 106/31.13
(58) Field of Classification Search ................. 347/100; 106/31.13
    See application file for complete search history.

(56) References Cited

U.S. PATENT DOCUMENTS

| 2002/0088375 | A1 | 7/2002 | Komatsu et al. | |
| 2002/0107303 | A1* | 8/2002 | Miyabashi et al. | 523/160 |
| 2002/0136868 | A1* | 9/2002 | Moriya et al. | 428/195 |
| 2003/0048326 | A1* | 3/2003 | Yamasaki et al. | 347/41 |
| 2003/0184629 | A1* | 10/2003 | Valentini et al. | 347/100 |

FOREIGN PATENT DOCUMENTS

| EP | 1 323 789 | 7/2003 |
| EP | 1323789 A1 * | 7/2003 |
| JP | 08-003498 | 1/1996 |
| JP | 10-060330 | 3/1998 |
| JP | 2000-072991 | 3/2000 |
| JP | 2000-351931 | 12/2000 |
| JP | 2001-081366 | 3/2001 |
| JP | 2001-247810 | 9/2001 |
| JP | 2002-080761 | 3/2002 |
| JP | 2003-187234 | 7/2003 |
| JP | 2004-240591 | 8/2004 |
| JP | 2005-6104 | 1/2005 |

OTHER PUBLICATIONS

Patent Abstracts of Japan and English Computer Generated Translation of JP 2002-080761 dated Mar. 19, 2002.
Patent Abstracts of Japan and English Computer Generated Translation of JP 2001-247810 dated Sep. 14, 2001.
Patent Abstracts of Japan and English Computer Generated Translation of JP 2001-081366 dated Mar. 27, 2001.
Patent Abstracts of Japan and English Computer Generated Translation of JP 2000-072991 dated Mar. 7, 2000.
Patent Abstracts of Japan and English Computer Generated Translation of JP 2000-351931 dated Dec. 19, 2000.
Patent Abstracts of Japan and English Computer Generated Translation of JP 10-060330 dated Mar. 3, 1998.
Patent Abstracts of Japan and English Computer Generated Translation of JP 08-003498 dated Jan. 9, 1996.
English Abstract of JP 2004-240591 dated Aug. 26, 2004.
English Abstract of JP 2005-6104 dated Jan. 6, 2005.
English Abstract of JP 2003-187234 dated Jul. 4, 2003.

* cited by examiner

*Primary Examiner*—Manish S. Shah
*Assistant Examiner*—Laura E Martin
(74) *Attorney, Agent, or Firm*—Ladas and Parry LLP

(57) ABSTRACT

An ink set that can realize printing of images having excellent image reproduction, color reproduction, and fixation. The ink set contains a black ink composition and a chromatic color ink composition, wherein the black ink composition has at least a surface-treated pigment dispersible and/or dissolvable in water without any dispersant, resin particles having a film forming temperature below 0° C., resin particles having a film forming temperature of 30° C. or above, and water as a main solvent, and the chromatic color ink composition contains at least a pigment, a polymer, which includes the pigment and renders the pigment dispersible in the ink composition, and water as a main solvent.

20 Claims, No Drawings

INK SET AND INK JET RECORDING METHOD

This application is a continuation of application Ser. No. 10/858,556 filed on Jun. 1, 2004 now abandoned, claims the benefit thereof and incorporates the same by reference.

BACKGROUND OF THE INVENTION

1. Field of the Invention

The present invention relates to an ink set having excellent color reproduction, and an ink jet recording method.

2. Background Art

Ink jet recording is a printing method wherein droplets of an ink composition are ejected and deposited on recording media, such as paper, to perform printing. The feature of the ink jet recording method is that images having high quality with high resolution can be printed at a high speed by means of a relatively inexpensive apparatus.

In recent years, a plurality of chromatic color ink compositions are used for ink jet recording to form a color image. In general, a color image is formed by using three color ink compositions, i.e., a yellow ink composition, a magenta ink composition, and a cyan ink composition, or four color ink compositions, i.e., the above three color ink compositions and additionally a black ink composition, or six color ink compositions, i.e., the above four color ink compositions and additionally a (light) cyan ink composition having a lower color density and a (light) magenta ink composition having a lower color density.

When ink dots formed by the plurality of color inks are allowed to be present in a mixed state, a variety of colors can be printed.

A color image having a low-lightness (dark) can be printed by forming, in a mixed state, ink dots of three colors of cyan color, magenta color, and yellow color. For example, ink dots of cyan color, ink dots of magenta color, and ink dots of yellow color are formed in substantially equal amounts so as to be mixed with one another, the image is visually perceived as a black image due to subtraction color mixing. The black expressed in this way is called "composite black."

In general, for recording media, from the viewpoint of avoiding a deterioration in image quality caused by bleeding of ink or the like, a predetermined target for the total amount of ink dots formed per unit area is provided. The target value for the total amount of ink dots is generally called "ink duty limit value."

When composite black is used for printing a low-lightness (dark) color image, three types of ink dots should be formed. In this case, disadvantageously, the total amount of ink dots sometimes exceeds the ink duty limit value, often leading to deteriorated image quality. On the other hand, when the ink duty limit value is much larger than the amount of ink deposited, a phenomenon that blank spaces are left in the image, that is, a phenomenon called "white spots," sometimes disadvantageously occurs. To avoid this unfavorable phenomenon, a method is adopted in which a black ink is provided in a color printer and ink dots of the black ink per se are used instead of the composite black.

In general, however, dots formed by the black ink are so conspicuous that, for some image, due to the conspicuous dots, granular feeling sometimes occurs in the formed image.

Further, in ink compositions, good fixation of colorants onto recording media is required. For example, the ink composition is required to yield an image having rubbing/scratch resistance on such a level that, when the image deposited on a recording medium is rubbed with a finger, a printing implement (for example, a line marker) or the like, the image does not become dirty. In order to meet this requirement, Japanese Patent Laid-Open No. 81366/2001 proposes an ink comprising a colorant and resin particles, and Japanese Patent Laid-Open No. 80761/2002 proposes an ink composition for ink jet recording, comprising an aqueous medium of pigment and resin particles.

However, there is still a demand for an ink composition and an ink set having various excellent properties, especially an ink composition and an ink set having excellent image reproduction, color reproduction, and fixation, and an ink jet recording method using the same.

SUMMARY OF THE INVENTION

The present inventors have now found that excellent image reproduction, color reproduction, and fixation can be realized in color printed images in which expression of black is necessary, by using a combination of a self-dispersible surface-treated pigment with at least two types of resin particles as a colorant in a black ink composition and using a pigment dispersed with the aid of a polymer as a colorant in a chromatic color ink composition. The present invention has been made based on such finding.

Accordingly, an object of the present invention is to provide an ink set and an ink jet recording method which can realize printing of images having excellent image reproduction, color reproduction, and fixation.

According to a first aspect of the present invention, there is provided an ink set comprising a black ink composition and at least one chromatic color ink composition, wherein said black ink composition comprises at least a surface-treated pigment dispersible and/or dissolvable in water without any dispersant, two or more types of resin particles, and water as a main solvent, at least one type of resin particles among the two or more types of resin particles have a film forming temperature below 0° C., and at least one type of resin particles among the two or more types of resin particles have a film forming temperature of 30° C. or above, and said chromatic color ink composition comprises at least a pigment, a polymer, which includes said pigment and renders said pigment dispersible in the ink composition, and water as a main solvent, wherein said polymer contains hydrophobic and hydrophilic groups and is substantially insoluble in the ink composition.

According to a second aspect of the present invention, there is provided an ink set comprising a black ink composition and at least one chromatic color ink composition, wherein said black ink composition comprises at least a surface-treated pigment dispersible and/or dissolvable in water without any dispersant, two or more types of resin particles, and water as a main solvent, at least one type of resin particles among the two or more types of resin particles have a film forming temperature below 0° C., and at least one type of resin particles among the two or more types of resin particles have a film forming temperature of 30° C. or above, and said chromatic color ink composition comprises at least a pigment, a polymer, which includes said pigment and renders said pigment dispersible in the ink composition, and water as a main solvent, wherein said polymer is a vinyl polymer prepared by polymerizing A) 5 to 45% by weight of at least one monomer selected from monomer A1 represented by formula (I):

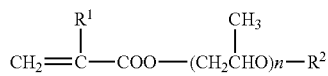

wherein $R^1$ represents a hydrogen atom or a methyl group, $R^2$ represents a hydrogen atom or an alkyl group having 1 to 20 carbon atoms, and n is 1 to 30, monomer A2 represented by formula (II):

wherein $R^1$, $R^2$, and n are as defined in formula (I), m is 1 to 30, and the oxyethylene groups and the oxypropylene groups within [ ] may be added to each other as blocks or randomly, and monomer A3 represented by formula (III):

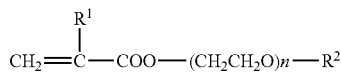

wherein $R^1$, $R^2$, and n are as defined in formula (I),

B) 3 to 40% by weight of a monomer containing a salt forming group,

C) 5 to 40% by weight of a macromonomer having a number average molecular weight of 500 to 500,000, and D) 0 to 87% by weight of a monomer copolymerizable with monomers A), B), and C).

According to a third aspect of the present invention, there is provided an ink jet recording method comprising the step of ejecting and depositing droplets of ink compositions onto a recording medium to perform printing, wherein said ink compositions are a black ink composition and at least two chromatic color ink compositions that, when used in combination, can realize achromatic color printing, said black ink composition comprises at least a surface-treated pigment dispersible and/or dissolvable in water without any dispersant, two or more types of resin particles, and water as a main solvent, at least one type of resin particles among the two or more types of resin particles have a film forming temperature below 0° C., and at least one type of resin particles among the two or more types of resin particles have a film forming temperature of 30° C. or above, said chromatic color ink composition comprises at least a pigment, a polymer, which includes said pigment and renders said pigment dispersible in the ink composition, and water as a main solvent, wherein said polymer contains hydrophobic and hydrophilic groups and is substantially insoluble in the ink composition, and when ink dots printed by a combination of said chromatic color ink compositions are an achromatic color or a chromatic color having a low lightness, ink dots are printed by ejecting said black ink composition instead of the combination of said chromatic color ink compositions.

According to a fourth aspect of the present invention, there is provided an ink jet recording method comprising the step of ejecting and depositing droplets of ink compositions onto a recording medium to perform printing, wherein said ink compositions are a black ink composition and at least two chromatic color ink compositions that, when used in combination, can realize achromatic color printing, said black ink composition comprises at least a surface-treated pigment dispersible and/or dissolvable in water without any dispersant, two or more types of resin particles, and water as a main solvent, at least one type of resin particles among the two or more types of resin particles have a film forming temperature below 0° C., and at least one type of resin particles among the two or more types of resin particles have a film forming temperature of 30° C. or above, and said chromatic color ink composition comprises at least a pigment, a polymer, which includes said pigment and renders said pigment dispersible in the ink composition, and water as a main solvent, wherein said polymer is an ink set comprising a black ink composition and at least one chromatic color ink composition, said black ink composition comprises at least a surface-treated pigment dispersible and/or dissolvable in water without any dispersant, at least two types of resin particles, and water as a main solvent, at least one type of resin particles among the two or more types of resin particles have a film forming temperature below 0° C., and at least one type of resin particles among the two or more types of resin particles have a film forming temperature of 30° C. or above, and said chromatic color ink composition comprises at least a pigment, a polymer, which includes said pigment and renders said pigment dispersible in the ink composition, and water as a main solvent, wherein said polymer is a vinyl polymer prepared by polymerizing A) 5 to 45% by weight of at least one monomer selected from monomer A1 represented by formula (I):

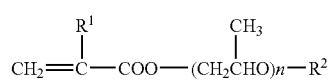

wherein $R^1$ represents a hydrogen atom or a methyl group, $R^2$ represents a hydrogen atom or an alkyl group having 1 to 20 carbon atoms, and n is 1 to 30, monomer A2 represented by formula (II):

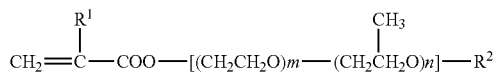

wherein $R^1$, $R^2$, and n are as defined in formula (I), m is 1 to 30, and the oxyethylene groups and the oxypropylene groups within [ ] may be added to each other as blocks or randomly, and monomer A3 represented by formula (III):

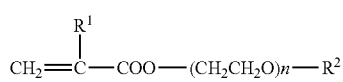

wherein $R^1$, $R^2$, and n are as defined in formula (I),

B) 3 to 40% by weight of a monomer containing a salt forming group,

C) 5 to 40% by weight of a macromonomer having a number average molecular weight of 500 to 500,000, and D) 0 to 87% by weight of a monomer copolymerizable with monomers A), B), and C), and when ink dots printed by a combination of said chromatic color ink compositions are an achromatic color or a chromatic color having a low lightness, ink dots are printed by ejecting said black ink composition instead of the combination of said chromatic color ink compositions.

According to the ink set of the present invention, the so-called "white spot" or "color bleeding" which sometimes occurs in printing on plain paper can be prevented. In addition, the rubbing/scratch resistance of images yielded on recording media can be improved. The use of the ink set according to the present invention or the application of the recording method according to the present invention can realize printing of images with excellent image reproduction and color reproduction.

DETAILED DESCRIPTION OF THE INVENTION

Ink Set

The ink set according to the present invention comprises a black ink composition and at least one chromatic color ink composition.

The term "chromatic color ink composition" as used herein refers to an ink composition that exhibits a color, that is, a color having chroma (chromatic color) and can realize the so-called "chromatic color printing." This term is used in comparison with a black ink composition for printing only an achromatic color not having chroma. "Chromatic colors" include, for example, colors of cyan, magenta, and yellow.

In a preferred embodiment of the present invention, the chromatic color ink composition comprises two or more chromatic color ink compositions that can be used in combination to realize printing of an achromatic color. The expression "can be used in combination to realize printing of an achromatic color" refers to the case where an achromatic color can be expressed by combining ink dots formed by a plurality of chromatic color ink compositions used. In this case, the concentration and amount of the chromatic color ink compositions used are not particularly limited so far as the achromatic color can be expressed.

In a more preferred embodiment of the present invention, the chromatic color ink compositions are a cyan ink composition, a magenta ink composition, and a yellow ink composition. Still more preferably, the chromatic color ink compositions are two cyan ink compositions different from each other in color density, two magenta ink compositions different from each other in color density, and a yellow ink composition.

Black Ink Composition (1) Surface-Treated Pigment

The surface-treated pigment contained in the black ink composition refers to a pigment in which a number of hydrophilic functional groups and/or salts thereof have been bonded, either directly or indirectly through an alkyl, alkyl ether, aryl, or other group, to the surface of the pigment to render the pigment dispersible and/or dissolvable in an aqueous medium without the aid of any dispersant. Due to this nature, the surface-treated pigment according to the present invention is sometimes called "self-dispersible pigment." In the present invention, when the pigment is stably present in water without any dispersant, this state is expressed as the state of "dispersion and/or dissolution." Not infrequently, it is difficult to clearly distinguish the state of dissolution of a material from the state of dispersion of the material. In the present invention, any pigment can be used so far as the pigment can stably exist in water without any dispersant, independently of whether the pigment is in a dispersion form or a solution form. Therefore, in the present specification, a pigment, which can stably exist in water without any dispersant, is sometimes referred to as a "water-soluble pigment." The pigment in this case, however, does not exclude a pigment which is in the state of dispersion.

A specific example of "hydrophilic functional group and/or its salt" is at least one functional group of a carbonyl, carboxyl, hydroxyl, sulfone, phosphono, or quaternary amine group, or its salt. Specific examples of methods for applying the above hydrophilic functional group or the like to the pigment include physical treatment and chemical treatment. Specific examples of the physical treatment include vacuum plasma treatment. Specific examples of the chemical treatment include a wet oxidation method in which the surface of the pigment is oxidized with an oxidizing agent in water, and a method in which p-aminobenozic acid is bonded to the surface of the pigment to bond a carboxyl group to the surface of the pigment through a phenyl group. In a preferred embodiment of the present invention, the surface-treated pigment is prepared by oxidation treatment of the pigment with a hypohalous acid and/or a hypohalite or by oxidation treatment of the pigment with ozone. The surface-treated pigments prepared by these treatments have a high level of color development and thus are preferred.

The surface-treated pigment usable in the present invention can be prepared by a method described, for example, in Japanese Patent Laid-Open No. 3498/1996. Commercially available products may also be used as the above pigment, and preferred examples thereof include Microjet CW 1 manufactured by Orient Chemical Industries, Ltd.

The average particle diameter of the surface treated pigment according to the present invention is preferably in the range of 50 to 250 nm from the viewpoints of storage stability of ink, prevention of nozzle clogging and the like. In the present invention, the amount of the surface treated pigment added is preferably not less than 1% by weight and not more than 15% by weight based on the whole amount of the black ink composition. The upper limit of the amount of the surface treated pigment added is more preferably 10% by weight, and the lower limit of the amount of the surface treated pigment added is more preferably 2% by weight.

(2) Resin Particles

The black ink composition according to the present invention comprises at least two types of resin particles. At least one type of resin particles in the at least two types of resin particles have a film forming temperature below 0° C., and another at least one type of resin particles in said at least two types of resin particles have a film forming temperature of 30° C. or above.

The film forming temperature is judged by thinly coating an aqueous solution or aqueous dispersion prepared by dissolving or dispersing resin particles in water onto a plate of a metal such as aluminum, drying the coating at a specified temperature, and observing the dried coating. Resin particles, which can be brought to a film, form a transparent continuous film, while resin particles, which cannot be brought to a film, cause a milky state.

A specific example of the resin constituting resin particles is preferably selected from the group consisting of acrylic resins, methacrylic resins, styrene resins, urethane resins, acrylamide resins, epoxy resins, and mixtures thereof. These resins may be a homopolymer or a copolymer and may have a single-phase or two-phase structure (a core/shall type).

Any one type of resin particles in the at least two types of resin particles according to the present invention are preferably in the form of an emulsion of resin particles prepared by emulsion polymerization of an unsaturated monomer and/or a crosslinkable monomer and the like in an aqueous medium. When the resin particles are added in an emulsion form to the ink composition, the resin particles can be homogeneously dispersed to improve the storage stability of the ink composition. An acrylic emulsion may be mentioned as a preferred form of the emulsion of resin particles.

The emulsion of resin particles can be prepared, for example, by emulsion polymerization of an unsaturated monomer (an unsaturated vinyl monomer or the like) or a specific crosslinkable monomer or the like in an aqueous medium in the presence of a polymerization initiator or a surfactant. The emulsion of resin particles can also be prepared by polymerizing an unsaturated monomer or a specific crosslinkable monomer or the like using a polymerization initiator or a surfactant and then dispersing/dissolving this polymer in an aqueous medium.

Specific examples of unsaturated monomers include those commonly used in emulsion polymerization, such as acrylic ester monomers, methacrylic ester monomers, aromatic vinyl monomers, vinyl ester monomers, vinyl cyanide compound monomers, halogenated monomers, olefin monomers, and diene monomers. Specific examples thereof include: acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanide compounds, such as acrylonitrile and methacrylonitrile; halogenated monomers, such as vinylidene chloride and vinyl chloride; aromatic vinyl monomers, such as styrene, α-methylstyrene, vinyltoluene, 4-t-butylstyrene, chlorostyrene, vinylanisole, and vinylnaphthalene; olefins, such as ethylene and propylene; dienes, such as butadiene and chloroprene; vinyl monomers, such as vinyl ether, vinyl ketone, and vinylpyrrolidone; unsaturated carboxylic acids such as acrylic acid, methacrylic acid, itaconic acid, fumaric acid, and maleic acid; acrylamides, such as acrylamide, methacrylamide, and N,N'-dimethyl acrylamide; and hydroxyl-containing monomers, such as 2-hydroxyethyl acrylate, 2-hydroxypropyl acrylate, 2-hydroxyethyl methacrylate, and 2-hydroxypropyl methacrylate. They may be used either solely or as a mixture of two or more.

Specific examples of specific crosslinkable monomers include those having two or more polymerizable double bonds. Specific examples thereof include: diacrylate compounds, such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; methylene bisacrylamide; and divinylbenzene. They may be used either solely or as a mixture of two or more.

In the polymerization of the monomers, chain transfer agents, neutralizing agents and the like may be utilized. Specific examples of neutralizing agents include ammonia, hydroxides of inorganic alkalis, preferably, for example, sodium hydroxide and potassium hydroxide.

The average particle diameter of the resin particles is preferably 50 to 250 nm. The average particle diameter may be measured with Microtrac UPA 150 (manufactured by Microtrac), a particle size distribution measuring apparatus LPA 3100 (manufactured by Otsuka Denshi K. K.) or the like.

In the present invention, the amount of the resin particles (on a solid content basis) added is preferably not less than 0.5% by weight and not more than 10% by weight based on the total amount of the black ink composition. The upper limit of the amount of the resin particles added is more preferably 7.5% by weight, and the lower limit of the amount of the resin particles added is more preferably 1% by weight.

When the amount or average particle diameter of the resin particles added is in the above-defined range, the stability and reliability of the black ink composition can be improved.

(3) Water and Other Ingredients

Water

The black ink composition according to the present invention comprises water as a main solvent. Water is preferably pure water obtained by ion exchange, ultrafiltration, reverse osmosis, distillation or the like, or ultrapure water. In particular, water, which has been sterilized, for example, by ultraviolet irradiation or by addition of hydrogen peroxide, is preferred, because this treatment can prevent the growth of mold or bacteria and, thus, the ink composition can be stored for a long period of time.

Water-Soluble Organic Solvent

The black ink composition according to the present invention preferably contains a water-soluble organic solvent. The water-soluble organic solvent functions mainly as a penetrating agent, a humectant, a viscosity modifier and the like of the black ink composition. Specific examples of water-soluble organic solvents include: polyhydric alcohols, such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides, such as glucose, mannose, fructose, ribose, xylose, arabinose, galactose, aldonic acid, glucitol, sorbit, maltose, cellobiose, lactose, sucrose, trehalose, and maltotriose; the so-called solid wetting agents such as sugar alcohols, hyaluronic acids, and ureas; alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone; N-methyl-2-pyrrolidone; 1,3-dimethyl-2-imidazolidinone; formamide; acetamide; dimethyl sulfoxide; sorbit; sorbitan; acetin; diacetin; triacetin; and sulfolane. They can be used solely or in a combination of two or more.

In a preferred embodiment of the present invention, among the above water-soluble organic solvents, those selected from the group consisting of polyhydric alcohols, glycol butyl ethers, pyrrolidones, and mixtures thereof are used. More preferably, a combination of polyhydric alcohols, glycol butyl ethers, and pyrrolidones is used. The addition of this combination to the black ink composition can improve reliability of the black ink composition, such as print quality, ejection stability, and nozzle clogging prevention.

Preferred polyhydric alcohols include those selected from the group consisting of glycerin, diethylene glycol, triethylene glycol, 1,5-pentanediol, 1,2-hexanediol, and mixtures thereof. Preferred glycol butyl ethers include diethylene glycol monobutyl ether and/or triethylene glycol monobutyl ether. Preferred pyrrolidones include 2-pyrrolidone.

The amount of the water-soluble organic solvent added is preferably not less than 5% by weight and not more than 40% by weight based on the total amount of the black ink composition. The upper limit of the amount of the water-soluble organic solvent added is more preferably 30% by weight, and the lower limit of the amount of the water-soluble organic solvent added is more preferably 10% by weight.

Surfactant

The black ink composition according to the present invention preferably contains a surfactant. Examples of surfactants include anionic surfactants, cationic surfactants, amphoteric surfactants, and nonionic surfactants. Nonionic surfactants are preferred because ink compositions which are less likely to cause foaming or frothing can be provided. Specific examples of nonionic surfactants usable herein include: acetylene glycol surfactants; acetylene alcohol surfactants; ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; ester surfactants, such as polyoxyethyleneoleic acid, polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate; silicon surfactants, such as dimethylpolysiloxane; and fluorosurfactants, such as fluoroalkyl esters and salts of perfluoroalkylcarboxylic acid. Acetylene glycol surfactants and acetylene alcohol surfactants are particularly preferred. These surfactants, when added to the ink composition, are less likely to cause foaming and, in addition, have excellent antifoaming properties and thus are preferred. Specific examples of acetylene glycol surfactants and acetylene alcohol surfactants usable herein include 2,4,7,9-tetramethyl-5-decyne-4,7-diol, 3,6-dimethyl-4-octyne-3,6-diol, and 3,5-dimethyl-1-hexyn-3-ol. Commercially available products may also be used, and examples thereof include Surfynol 104, Surfynol 82, Surfynol 465, Surfynol 485, and Surfynol TG, manufactured by Air Products and Chemicals Inc., and OLFINE STG and OLFINE E 1010, manufactured by Nissin Chemical Industry Co., Ltd.

The amount of the surfactant added is preferably not less than 0.05% by weight and not more than 3% by weight based on the total amount of the black ink composition. The upper limit of the amount of the surfactant added is more preferably 2.0% by weight, and the lower limit of the amount of the surfactant added is more preferably 0.1% by weight.

pH Adjustor

The black ink composition according to the present invention preferably further comprises a pH adjustor. Specific examples of pH adjustors include hydroxides of alkali metals, such as lithium hydroxide, potassium hydroxide, and sodium hydroxide, and amines, such as ammonia, triethanolamine, tripropanolamine, diethanolamine, and monoethanolamine. The pH adjustor is preferably selected from the group consisting of hydroxides of alkali metals, ammonia, triethanolamine, tripropanolamine, and mixtures thereof. The ink composition is preferably adjusted to pH 6 to 10 by the addition of a pH adjustor. When the ink composition is adjusted to this pH range, the ink composition does not adversely affect materials and the like constituting an ink jet printer and, in addition, clogging of the recording head by the ink composition can be effectively prevented. Therefore, the amount of the pH adjustor added is preferably such that the ink composition is adjusted to pH 6 to 10.

Other Ingredients

If necessary, the black ink composition according to the present invention may contain pH buffers, antioxidants, ultraviolet absorbers, preservatives or fungicides, chelating agents and the like.

Specific examples of pH buffers include collidine, imidazole, phosphoric acid, 3-(N-morpholino)propanesulfonic acid, tris(hydroxymethyl)aminomethane, and boric acid.

Specific examples of antioxidants or ultraviolet absorbers include: allophanates, such as allophanate and methyl allophanate; biurets, such as biuret, dimethyl biuret, and tetramethyl biuret; L-ascorbic acid and its salt; Tinuvin 328, 900, 1130, 384, 292, 123, 144, 622, 770, and 292, Irgacor 252 and 153, and Irganox 1010, 1076, 1035, and MD 1024, manufactured by Ciba-Geigy; and lanthanide oxides.

Specific examples of preservatives or fungicides include sodium benzoate, pentachlorophenol sodium, 2-pyridinethiol-1-oxide sodium, sodium sorbate, sodium dehydroacetate, and 1,2-dibenzisothiazolin-3-one (Proxel CRL, Proxel BDN, Proxel GXL, Proxel XL-2, and Proxel TN, manufactured by Avecia). Specific examples of chelating agents include ethylenediaminetetraacetic acid (EDTA).

Chromatic Color Ink Composition

The chromatic color ink composition according to the present invention comprises at least a pigment, a polymer, which includes the pigment and renders the pigment dispersible in the ink composition, and water as a main solvent.

in the present invention, the pigment is included in the polymer and consequently takes a particle form. This particle is prepared from a pigment and a polymer which will be described later. The preparation of the particle described in detail later will be briefly described. A pigment, a polymer dissolved or dispersed in an organic solvent, water, and optionally a neutralizing agent are mixed with and dispersed in one another, the organic solvent is removed, and the desolvated product is dispersed to give particles including the pigment.

(1) Pigment

An organic pigment which has hitherto been used in ink compositions for ink jet recording may be used as the pigment contained in the chromatic color ink composition according to the present invention.

Organic pigments include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), nitro pigments, nitroso pigments, and aniline black.

When a cyan ink composition is used as the chromatic color ink composition, a cyan pigment is preferred as the colorant of the cyan ink composition.

Preferred cyan pigments include C.I. Pigment Blue 15:3, C.I. Pigment Blue 15:4, and C.I. Pigment Blue 60, particularly preferably C.I. Pigment Blue 15:3.

When a magenta ink composition is used as the chromatic color ink composition, a magenta pigment is preferred as the colorant of the magenta ink composition.

Preferred magenta pigments include C.I. Pigment Red 122, C.I. Pigment Red 202, C.I. Pigment Red 209, and C.I. Pigment Violet 19. C.I. Pigment Red 122 is particularly preferred.

When a yellow ink composition is used as the chromatic color ink composition, a yellow pigment is preferred as the colorant of the yellow ink composition.

Yellow pigments include C.I. Pigment Yellow 74, C.I. Pigment Yellow 93, C.I. Pigment Yellow 109, C.I. Pigment Yellow 110, C.I. Pigment Yellow 128, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

These cyan pigments, magenta pigments, and yellow pigments may be used either solely or as a mixture of two or more.

In a preferred embodiment of the present invention, the chromatic color ink compositions may be a yellow ink composition, two magenta ink compositions different from each other in color density, and two cyan ink compositions different from each other in color density. The two magenta ink compositions different from each other in color density are such that one of the two magenta ink compositions is a magenta ink composition having a higher color density while the other magenta ink composition is a magenta ink composition having a lower color density (hereinafter often referred to as "a light magenta ink composition"). The two cyan ink compositions different from each other in color density are such that one of the two cyan ink compositions is a cyan ink composition having a higher color density while the other cyan ink composition is a cyan ink composition having a lower color density (hereinafter often referred to as "a light cyan ink composition"). The light magenta ink composition and the light cyan ink composition can be prepared by properly selecting a pigment and other ingredients or properly varying the mixing ratio of these materials to lower the color density.

In addition to cyan, magenta, or yellow ink compositions, other chromatic color ink compositions, for example, an orange ink composition and a green ink composition may be used as the chromatic color ink compositions. Pigments usable in these ink compositions include orange pigments, such as C.I. Pigment Orange 36 and C.I. Pigment Orange 43, and green pigments, such as C.I. Pigment Green 7 and C.I. Pigment Green 36.

(2) Polymer (a) Polymer used in ink according to first aspect of invention

The polymer used in ink according to the first aspect of the present invention contains hydrophobic and hydrophilic groups, renders the pigment dispersible in water while including the pigment in the polymer, and is substantially insoluble in the ink composition.

In the present invention, preferably, the polymer has an acid value of 30 to 125 KOH mg/g. The lower limit of the acid value is more preferably 50 KOH mg/g, and the upper limit of the acid value is more preferably 100 KOH mg/g.

In the present invention, preferably, the polymer has a number average molecular weight of 1,000 to 200,000. The lower limit of the number average molecular weight is more preferably 3,000, and the upper limit of the number average molecular weight is more preferably 150,000.

For the polymer in the present invention, the percentage salt formation of dissociative hydrophilic group (for example, carboxyl group), that is, the percentage neutralization, is regulated to less than 100% in the step of pigment inclusion or the step of formulation of ink composition which will be described later. In a preferred embodiment of the present invention, the lower limit of the percentage neutralization is preferably 60%, and the upper limit of the percentage neutralization is preferably 95%.

The polymer functions to include the pigment in a process, which will be described later, and, at the same time, to disperse the pigment in the ink composition. The polymer per se is substantially insoluble in the ink composition. Therefore, the polymer particles including the pigment in the ink composition according to the present invention can be found as particles having substantially distinct particle diameter. The utilization of the above polymer can realize stable dispersion of the pigment and can realize images having good fixation.

In a preferred embodiment of the present invention, the hydrophobic group possessed by the polymer is at least one group selected from alkyl groups, cycloalkyl groups, and aromatic rings. Examples of preferred aromatic rings include aryl groups (for example, phenyl, naphthyl, and anthryl groups) and derivatives thereof.

In a preferred embodiment of the present invention, the hydrophilic group possessed by the polymer is at least one group selected from carboxyl, sulfonic acid, hydroxyl, amino, and amide groups, and their bases.

In the present invention, the polymer may be prepared from a monomer or oligomer having an acryloyl, methacryloyl, vinyl, or allyl group having a double bond.

In the present invention, specific examples of monomers constituting the polymer include those having an aromatic ring, for example, styrene, (α, 2, 3, or 4)-alkylstyrene, (α, 2, 3, or 4)-alkoxystyrene, 3,4-dimethylstyrene, α-phenylstyrene, divinylbenzene, vinylnaphthalene, benzyl(meth)acrylate, and phenoxyethyl (meth)acrylate, and di(meth)acrylate of ethylene oxide adduct of bisphenol A or bisphenol F. Other monomers include tetrahydrofurfuryl acrylate, butyl methacrylate, dimethylamino (meth)acrylate, dimethylaminoethyl (meth)acrylate, dimethylaminopropyl acrylamide, N,N-dimethylaminoethyl acrylate, acryloyl morpholine, N,N-dimethylacrylamide, N-isopropylacrylamide, N,N-diethylacrylamide, methyl(meth)acrylate, ethyl(meth) acrylate, propyl(meth)acrylate, ethylhexyl(meth)acrylate, other alkyl(meth)acrylates, methoxydiethylene glycol (meth)

acrylate, and (meth)acrylates of diethylene glycol or polyethylene glycol of an ethoxy group, a propoxy group, and a butoxy group, cyclohexyl(meth)acrylate, isobonyl(meth)acrylate, hydroxyalkyl (meth)acrylate, other fluorine-, chlorine-, or silicon-containing (meth)acrylates, (meth)acrylamide, maleic acid amide, and (meth)acrylic acid. When a crosslinked structure is introduced into the polymer, in addition to the above monofunctional monomer, compounds having an acryl or methacryl group, for example, (mono, di, tri, tetra, or poly)ethylene glycol di(meth)acrylate, methacrylates of 1,4-butanediol, 1,5-pentanediol, 1,6-hexanediol, 1,8-octanediol, 1,10-decanediol and the like, trimethylolpropane tri(meth)acrylate, glycerin (di or tri)(meth)acrylate, neopentyl glycol di(meth)acrylate, pentaerythritol tetra(meth)acrylate, and dipentaerythritol hexa(meth)acrylate, may be used. A method may also be used in which the production is carried out while adding a styrene-acrylic acid copolymer, polystyrene, or polyimide as the aromatic ring-containing polymer and at least one other polymer selected from the group consisting of polyacrylic esters, polyesters, polyamides, silicon-containing polymers, and sulfur-containing polymers so that the polymer is composed mainly of these polymers.

The polymer used in the present invention is prepared by polymerization of the above monomer. Preferred polymerization initiators usable herein include initiators commonly used in radical polymerization, for example, potassium persulfate, ammonium persulfate, hydrogen persulfate, azobisisobutyronitrile, benzoyl peroxide, dibutyl peroxide, peracetic acid, cumene hydroperoxide, t-butyl hydroxyperoxide, and p-menthane hydroxyperoxide.

The polymer used in the present invention is preferably prepared by emulsion polymerization. In the emulsion polymerization, a chain transfer agent may also be used. Specific examples of chain transfer agents include t-dodecylmercaptan, n-dodecylmercaptan, n-octylmercaptan, xanthogens, such as dimethylxanthogen disulfide, diisobutylxanthogen disulfide, dipentene, indene, 1,4-cyclohexadiene, dihydrofuran, and xanthene.

In a preferred embodiment of the present invention, the polymer may be composed mainly of at least one polymer selected from the group consisting of polyacrylic esters, styrene-acrylic acid copolymers, polystyrene, polyesters, polyamides, polyimides, silicon-containing polymers, and sulfur-containing polymers.

Further, in the present invention, the polymer may be a copolymer of a polymerizable group-containing dispersant with a copolymerizable monomer. The polymerizable group-containing dispersant refers to a dispersant containing at least hydrophobic, hydrophilic, and polymerizable groups. Specific examples of polymerizable groups include acryloyl, methacryloyl, ally, and vinyl groups. Likewise, specific examples of copolymerizable groups include acryloyl, methacryloyl, ally, and vinyl groups.

(b) Polymer used in ink according to second aspect of invention

The polymer used in the ink according to the second aspect of the present invention is prepared by polymerizing the following monomers A) to D).

Monomer A)

Monomer A) refers to at least one monomer selected from monomer A1 represented by formula (I), monomer A2 represented by formula (II), and monomer A3 represented by formula (III).

A) monomer A1 represented by formula (I):

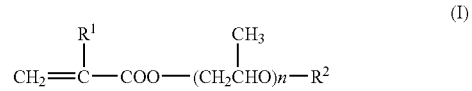

wherein $R^1$ represents a hydrogen atom or a methyl group, $R^2$ represents a hydrogen atom or an alkyl group having 1 to 20 carbon atoms, and n is 1 to 30, monomer A2 represented by formula (II):

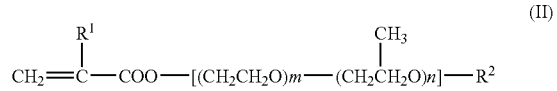

wherein $R^1$, $R^2$, and n are as defined in formula (I), m is 1 to 30, and the oxyethylene groups and the oxypropylene groups within [ ] may be added to each other as blocks or randomly, and monomer A3 represented by formula (III):

wherein $R^1$, $R^2$, and n are as defined in formula (I).

Specific examples of monomer A1 include polypropylene glycol mono(meth)acrylate. They may be used either solely or as a mixture of two or more.

Specific examples of monomer A2 include ethylene glycol or propylene glycol (meth)acrylate, poly(ethylene glycol or propylene glycol) mono(meth)acrylate, octoxy polyethylene glycol or polypropylene glycol mono(meth)acrylate, octoxy poly(ethylene glycol or propylene glycol) mono(meth)acrylate, stearoxy polyethylene glycol or polypropylene glycol mono(meth)acrylate, stearoxy poly(ethylene glycol or propylene glycol) mono(meth)acrylate, nonylphenoxy polyethylene glycol or polypropylene glycol mono(meth)acrylate, and nonylphenoxy poly(ethylene glycol or propylene glycol) mono(meth)acrylate. They may be used either solely or as a mixture of two or more.

Examples of commercially available monomer A1 or A2 include Blemmer PP-1000, Blemmer PP-500, Blemmer PP-800, Blemmer AP-150, Blemmer AP-400, Blemmer AP-550, Blemmer AP-800, Blemmer 50 PEP-300, Blemmer 70 PEP-350B, Blemmer AEP series, Blemmer 30 PPT-800, Blemmer 50 PPT-800, Blemmer 70 PPT-800, Blemmer APT series, Blemmer 10 PPB-500B, Blemmer 10 APB-500B, Blemmer 50 POEP-800B, Blemmer 50 AOEP-800B, Blemmer ASEP series, Blemmer PNEP series, Blemmer PNPE series, Blemmer 43 ANEP-500, and Blemmer 70 ANEP-550, manufactured by Nippon Oils & Fats Co., Ltd.

Specific examples of monomer A3 include polyethylene glycol mono(meth)acrylate.

Specific examples of commercially available monomer A include: NK Ester M-20G, NK Ester M-40G, NK Ester M-90G, and NK Ester M-230G, manufactured by Shin-Nakamura Chemical Co., Ltd.; and Blemmer PE series, Blemmer PME-100, Blemmer PME-200, Blemmer PME-400, and Blemmer PME-1000, manufactured by Nippon Oils & Fats Co., Ltd.

The content of (meth)acrylic ester monomer A in the vinyl polymer is 5 to 45% by weight, preferably 5 to 35% by weight, from the viewpoints of print density and ink viscosity.

Monomer B)

Monomer B is a monomer containing a salt forming group.

Preferred salt forming group-containing monomers are anionic monomers and cationic monomers. The anionic monomers and the cationic monomers may be used either solely or as a mixture of two or more.

A specific example of the anionic monomer is at least one monomer selected from the group consisting of unsaturated carboxylic acid monomers, unsaturated sulfonic acid monomers, and unsaturated phosphoric acid monomers.

Specific examples of unsaturated carboxylic acid monomers include acrylic acid, methacrylic acid, crotonic acid, itaconic acid, maleic acid, fumaric acid, citraconic acid, and 2-methacryloyloxymethylsuccinic acid. They may be used either solely or as a mixture of two or more.

The anionic monomer is preferably an unsaturated carboxylic acid monomer, more preferably acrylic acid and methacrylic acid from the viewpoints of ink viscosity and ejection stability.

Cationic monomers include polyvinylamine, polyallylamine, N,N-dimethylaminoethyl acrylate, and N,N-dimethylaminopropyl acrylamide. Among them, N,N-dimethylaminoethyl acrylate and N,N-dimethylaminopropyl acrylamide are particularly preferred.

The content of salt forming group-containing monomer B) is 3 to 40% by weight, preferably 5 to 30% by weight, from the viewpoints of dispersion stability and ejection stability.

Monomer C)

Monomer C) is a polystyrene macromonomer having a number average molecular weight of 1,000 to 10,000.

Preferred examples of macromonomers include macromers that have a polymerizable functional group on one end thereof and preferably have a number average molecular weight of 500 to 500,000, more preferably 1,000 to 10,000.

Specific examples of macromonomers include styrene macromers having a polymerizable functional group on one end thereof and styrene-acrylonitrile macromers having a polymerizable functional group on one end thereof. Among them, styrene macromers having a polymerizable functional group on one end thereof are preferred because the vinyl polymer can be satisfactorily contained together with the colorant.

Acrylonitrile may be mentioned as the monomer other than styrene constituting the styrene macromonomer having a polymerizable functional group on its one end. The styrene content is preferably not less than 60% by weight, more preferably not less than 70% by weight, from the viewpoint of satisfactorily incorporating the pigment in the vinyl polymer.

Among styrene macromers having a polymerizable functional group on one end thereof, those having an acryloyloxy or methacryloyloxy group as the polymerizable functional group on one end thereof are preferred.

Commercially available styrene macromers include, for example, AS-6, AN-6, AN-6S, HS-6S, and HS-6, manufactured by TOAGOSEI Co., Ltd.

The content of macromer C) is preferably 0.1 to 40% by weight, more preferably 1 to 30% by weight, from the viewpoints of waterfastness and rubbing/scratch resistance.

Monomer D)

Monomer D) is copolymerizable with monomer A), B), and C), and specific examples thereof include (meth)acrylic esters, aromatic ring-containing monomers, and macromers. They may be used either solely or as a mixture of two or more. Monomer D) preferably contains at least one member selected from the group consisting of aromatic ring-containing monomers and macromers from the viewpoints of waterfastness and rubbing/scratch resistance.

(Meth)acrylic esters include, for example, (meth)acrylic esters in which the ester part is an alkyl group having 1 to 18 carbon atoms, for example, methyl(meth)acrylate, ethyl (meth)acrylate, (iso)propyl (meth)acrylate, (iso or tertiary) butyl(meth)acrylate, (iso)amyl (meth)acrylate, cyclohexyl (meth)acrylate, benzyl(meth)acrylate, 2-ethylhexyl(meth) acrylate, (iso)octyl(meth)acrylate, (iso)decyl (meth)acrylate, (iso)dodecyl(meth)acrylate, and (iso)stearyl (meth)acrylate. They may be used either solely or as a mixture of two or more.

The term "(iso or tertiary)" and the term "(iso)" mean both the case where these groups are present and the case where these groups are absent. When these groups are absent, the compounds are normal.

The aromatic ring-containing monomer is preferably at least one monomer selected from the group consisting of styrene, vinylnaphthalene, α-methylstyrene, vinyltoluene, ethyl vinylbenzene, 4-vinylbiphenyl, 1,1-diphenylethylene, benzyl(meth)acrylate, phenoxyethyl(meth)acrylate, 2-hydroxy-3-phenoxypropyl acrylate, 2-methacryloyloxyethyl-2-hydroxypropyl phthalate, 2-acryloyloxyethylphthalic acid, and neopentyl glycol acrylate benzoate. Among them, at least one monomer selected from the group consisting of styrene, α-methylstyrene, vinyltoluene, and vinylnaphthalene is more preferred from the viewpoints of waterfastness and rubbing/scratch resistance.

The amount of these monomers present in the vinyl monomer prepared by the polymerization of monomers A), B), C), and D) is 5 to 45% by weight (preferably 10 to 35% by weight) for monomer A), 3 to 40% by weight (preferably 5 to 35% by weight) for monomer B), 5 to 40% by weight (preferably 10 to 35% by weight) for monomer C), and 0 (zero) to 87% by weight (preferably 0 (zero) to 75% by weight) for monomer D).

The weight average molecular weight of the vinyl polymer is preferably 3,000 to 300,000, more preferably 5,000 to 200,000, from the viewpoints of print density and ejection stability.

Preparation of Dispersion of Polymer Particles Including Pigment

The dispersion of polymer particles including the pigment used in the present invention may be prepared by the method described in Japanese Patent Laid-Open No. 247810/2001. Preferably, the dispersion of polymer particles including the pigment is prepared, for example, by a production process comprising the following steps, that is, (1) the step of mixing a polymer solution, prepared by dissolving the polymer in a water-soluble organic solvent, a pigment, optionally a neutralizing agent together to prepare a solvent dispersion, (2) the step of developing this dispersion in an aqueous phase to prepare an aqueous suspension (transfer emulsification step), and (3) the step of removing, by distillation, the water-soluble organic solvent added at the time of the preparation of the solvent dispersion to include the pigment in the polymer particles.

The neutralizing agent may be properly determined. Alkalis usable as the neutralizing agent include tertiary amines, such as trimethylamine and triethylamine, ammonia, sodium hydroxide, and potassium hydroxide. Acids usable as the neutralizing agent include inorganic bases, such as hydrochloric acid and sulfuric acid, and organic acids, such as acetic acid, propionic acid, lactic acid, succinic acid, glycolic acid, gluconi acid, and glyceric acid.

The organic solvent is preferably a water-soluble organic solvent, and examples thereof include alcohols, such as methanol, ethanol, and isopropanol, ketones, such as acetone, methyl ethyl ketone, diethyl ketone, and methyl isobutyl ketone, and ethers, such as dibutyl ether, tetrahydrofuran, and dioxane.

A dispergator may be used in the step of including the pigment in the polymer. In this step, dispersion is carried out with a dispergator such as a ball mill, a sand mill, an attritor, a roll mill, an agitator mill, a Henschel mixer, a colloid mill, an ultrasonic homogenizer, a jet mill, or an angmill. A high-pressure homogenizer is more preferred because contamination with broken pieces of dispersing media and the like is less likely to occur.

The particle diameter of the polymer particles thus obtained is preferably about 25 to 250 nm. More preferably, the lower limit of the particle diameter is about 30 nm, and the upper limit of the particle diameter is about 175 nm.

The weight ratio of the pigment to the polymer including the pigment is preferably 5:95 to 95:5, more preferably 10:90 to 90:10. The amount of the pigment added is preferably not less than 0.5% by weight and not more than 15% by weight in terms of the weight of the pigment only in a form included in the polymer and based on the total amount of chromatic color ink composition. The upper limit of the amount of the pigment added is more preferably 10% by weight, and the lower limit of the amount of the pigment added is more preferably 1% by weight.

(3) Water and Other Ingredients

In the present invention, the chromatic color ink composition contains water as a main solvent. Water may be pure water obtained by ion exchange, ultrafiltration, reverse osmosis, distillation or the like, or ultrapure water. Water, which has been sterilized, for example, by ultraviolet irradiation or by addition of hydrogen peroxide, is suitable because, when the ink composition is stored for a long period of time, it can prevent the growth of mold or bacteria.

Water-Soluble Organic Solvent

Preferably, the chromatic color ink composition further comprises a water-soluble organic solvent. The water-soluble organic solvent functions mainly as a penetrating agent, a humectant, a viscosity modifier and the like of the black ink composition.

Water-soluble organic solvents include those described above in connection with the black ink composition. More specific examples of water-soluble organic solvents include: monohydric alcohols, such as methanol, ethanol, n-propanol, iso-propanol, n-butanol, sec-butanol, tert-butanol, iso-butanol, and n-pentanol; and glycol monoalkyl ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether.

In a particularly preferred embodiment of the present invention, the water-soluble solvent is, for example, glycol mono-n-butyl ether.

This glycol mono-n-butyl ether is preferably selected from ethylene glycol mono-n-butyl ether, diethylene glycol mono-n-butyl ether, triethylene glycol mono-n-butyl ether, propylene glycol mono-n-butyl ether, and dipropylene glycol mono-n-butyl ether. These glycol mono-n-butyl ethers may also be used in a combination of two or more.

The amount of the water-soluble organic solvent added is preferably not less than 0.25% by weight and not more than 15% by weight based on the total amount of chromatic color ink composition. The upper limit of the amount of the water-soluble organic solvent added is more preferably 10% by weight, and the lower limit of the amount of the water-soluble organic solvent added is more preferably 0.5% by weight.

Surfactant

Preferably, the chromatic color ink composition according to the present invention further comprises a surfactant. Specific examples of surfactants, specific examples of preferred surfactants and the like may be the same as those described above in connection with the black ink composition. In a preferred embodiment of the present invention, the chromatic color ink composition according to the present invention contains a combination of a surfactant (particularly a nonionic surfactant) with the above-described water-soluble organic solvent.

Further, in another preferred embodiment of the present invention, both the black ink composition and the chromatic color ink composition constituting the ink set according to the present invention simultaneously further contains a nonionic surfactant and a water-soluble organic solvent as a penetrating agent. According to this ink set, images having better color reproduction can be yielded by printing.

The amount of the surfactant added is preferably not less than 0.05% by weight and not more than 3% by weight based on the total amount of chromatic color ink composition. The upper limit of the amount of the surfactant added is more preferably 2.0% by weight, and the lower limit of the amount of the surfactant added is more preferably 0.1% by weight.

1,2-Alkanediol

In the present invention, preferably, the chromatic color ink composition further comprises a 1,2-alkanediol.

The 1,2-alkanediol is preferably selected from the group consisting of 1,2-alkanediols having 4 to 10 carbon atoms. In this case, a plurality of 1,2-alkanediols may also be used as a mixture.

In a preferred embodiment of the present invention, the 1,2-alkanediol is selected from the group consisting of 1,2-butanediol, 1,2-pentanediol, 1,2-hexanediol, 1,2-heptanediol, and mixtures thereof. They advantageously has excellent penetrability into the recording medium.

In a more preferred embodiment of the present invention, the 1,2-alkanediol is 1,2-hexanediol or 1,2-pentanediol, still more preferably 1,2-hexanediol.

The amount of the 1,2-alkanediol added is preferably not less than 0.25% by weight and not more than 15% by weight based on the total amount of chromatic color ink composition. The upper limit of the 1,2-alkanediol added is more preferably 10% by weight, and the lower limit of the 1,2-alkanediol added is more preferably 0.5% by weight.

Other Ingredients

In a preferred embodiment of the present invention, the chromatic color ink composition contains polyols from the viewpoint of preventing nozzle clogging of an ink jet recording head. Such polyols are preferably water-soluble polyols, and examples thereof include ethylene glycol, diethylene glycol, triethylene glycol, tetraethylene glycol, propylene glycol, dipropylene glycol, tripropylene glycol, polyethylene glycol, 1,3-propylene glycol, isopropylene glycol, isobutylene glycol, 1,4-butanediol, 1,3-butanediol, 1,5-pentanediol, 1,6-hexanediol, glycerin, mesoerythritol, pentaerythritol, thiodiglycol, trimethylolpropane, trimethylolethane, 1,2,6-hexanetriol, trimethylolethane, trimethylolpropane, and pentaerythritol.

Further, lactams, such as 2-pyrrolidone, N-methyl-2-pyrrolidone, and ε-caprolactam, and ureas, such as urea, thiourea, ethyleneurea, and 1,3-dimethylimidazolidinones may also be used. Monosaccharides, disaccharides, oligosaccharides, and polysaccharides, for example, glucose, mannose, fructose, ribose, xylose, arabinose, galactose, aldonic acid, glucitol, sorbitol, maltose, cellobiose, lactose, sucrose, trehalose, and maltotriose may also be added. Further, derivatives of these saccharides may also be used. Examples of derivatives of these saccharides include reducing sugars, oxidized sugars, amino acids, and thiosugars of the above saccharides. Among them, sugar alcohols are particularly preferred, and specific examples thereof include maltitol and sorbitol. Further, commercially available products, for example, HS-500 and HS-300 (manufactured by Hayashibara Biochemical Laboratories, Inc.), may also be use. They may be used as a mixture of two or more.

The amount of the above clogging preventive ingredient added is preferably not less than 5% by weight and not more than 40% by weight based on the total amount of chromatic color ink composition. The upper limit of the clogging preventive ingredient is more preferably 30% by weight, and the lower limit of the clogging preventive ingredient is more preferably 10% by weight.

These ingredients, together with other ink additives, are preferably added in such addition amounts that the viscosity of the ink is not more than 25 cPs at 25° C.

In order to improve various properties of the chromatic color ink composition according to the present invention, the chromatic color ink composition may further contain other optional ingredients, for example, preservatives, antimolds, pH adjustors, antioxidants, electric conductivity adjustors, surface tension modifiers, oxygen absorbers or the like. Specific examples of these other optional ingredients include those described above in connection with the black ink composition.

Preparation of Ink Composition

The ink composition according to the present invention may be prepared by feeding the above ingredients into a dispergator/mixer (for example, a ball mill, a sand mill, an attritor, a basket mill, or a roll mill) to disperse them in one another. In a preferred embodiment of the present invention, the undiluted ink prepared in the dispergator/mixer is filtered through a filter such as a membrane filter or a mesh filter to remove coarse particles.

Applications of Ink Set

The ink set according to the present invention is used in a recording method using an ink composition. Recording methods using an ink composition include, for example, an ink jet recording method, a recording method using writing utensils, such as pens, and other various printing methods. In particular, the ink set according to the present invention is used in a recording method wherein an ink composition is deposited onto a recording medium to perform printing and is preferably used in an ink jet recording method.

Recording Method

According to a further aspect of the present invention, there is provided an ink jet recording method comprising the step of ejecting and depositing droplets of ink compositions onto a recording medium to perform printing, wherein ink compositions used are a black ink composition and at least two chromatic color ink compositions that, when used in combination, can realize achromatic color printing. In a preferred embodiment of the present invention, the ink set is the above-described ink set according to the present invention. When ink dots printed by a combination of the chromatic color ink compositions are an achromatic color or a chromatic color having a low lightness, ink dots are printed by ejecting the black ink composition instead of the combination of the chromatic color ink compositions. This ink jet recording method can prevent the occurrence of the so-called white spots or color bleeding caused often in printing on plain paper. Further, printing of images having excellent image reproduction and color reproduction can be realized.

In this recording method, the chromatic color having a low lightness has the following meaning. The amounts of YMC inks projected are determined based on dot data of YMC, and YMC dot data are based on RGB data of image. In the present invention, in 256 gradations of each of RGB, in the range of "white" of R255/G255/B255 to "black" of R0/G0/B0, a region below R240, G180, and B200 is "chromatic color having a low lightness." Accordingly, in the method according to the present invention, in the region below R240, G180, and B200, preferably, instead of the combination of the chromatic color ink compositions, the black ink composition is used for printing. More preferably, in a region below R230, G160, and B180, the black ink composition is used instead of the combination of the chromatic color ink compositions.

Further, according to the present invention, there is also provided a record produced by the above recording method.

EXAMPLES

The present invention will be further described with reference to the following Examples that are not intended as a limitation of the invention.

Black Ink Compositions

Preparation of Surface Treated Pigment Dispersion

Pigment Dispersion 1

A commercially available carbon black, Color Black S170 (tradename, manufactured by DEGUSSA HULS) (100 g), was mixed into 1 kg of water, and the mixture was ball milled with zirconia beads. Sodium hypochlorite (available chlorine 12%) (1400 g) was added dropwise to the milled undiluted liquid, and a reaction was allowed to proceed while ball milling for 5 hr. The reaction solution was further subjected to wet oxidation by boiling with stirring for 4 hr. The undiluted dispersion thus obtained was filtered through glass fiber filter paper GA-100 (tradename, manufactured by Advantec Toyo Kaisha Ltd.) and was further washed with water. The wet cake was redispersed in 5 kg of water, and the dispersion was desalted and purified by a reverse osmosis membrane to an electric conductivity of 2 mS/cm. The purified dispersion was further concentrated to a pigment concentration of 15% by weight to prepare dispersion 1.

The average particle diameter of the pigment in the dispersion was measured with a particle size distribution measuring apparatus Microtrac UPA 150 (manufactured by Microtrac) and was found to be 110 nm.

Pigment Dispersion 2

A commercially available carbon black, MA 8 (tradename, manufactured by Mitsubishi Chemical Corporation) (100 g), was mixed into 500 g of water, and the mixture was ball milled with zirconia beads. Sodium hypochlorite (available chlorine 12%) (500 g) was added dropwise to the milled undiluted liquid, and the mixture was further subjected to wet oxidation by boiling with stirring for 10 hr. The undiluted dispersion thus obtained was filtered through glass fiber filter paper GA-100 (tradename, manufactured by Advantec Toyo Kaisha Ltd.) and was further washed with water. The wet cake was redispersed in 5 kg of water, and the dispersion was desalted and purified by a reverse osmosis membrane to an electric conductivity of 2 mS/cm. The purified dispersion was further concentrated to a pigment concentration of 15% by weight to prepare dispersion 2.

The average particle diameter of the pigment in the dispersion was measured with a particle size distribution measuring apparatus Microtrac UPA 150 (manufactured by Microtrac) and was found to be 150 nm.

Pigment Dispersion 3 (Comparative Example)

A commercially available carbon black, MA 8 (tradename, manufactured by Mitsubishi Chemical Corporation) (100 g), 150 g of a water-soluble resin dispersant Joncryl J 62 (tradename, manufactured by Johnson Polymer Corp.), 6 g of sodium hydroxide, and 250 g of water were mixed together, and the mixture was dispersed by ball milling with zirconia beads for 10 hr. The undiluted dispersion thus obtained was filtered through glass fiber filter paper GA-100 (tradename, manufactured by Advantec Toyo Kaisha Ltd.) and was further washed with water. The wet cake was redispersed in 5 kg of water, and the dispersion was desalted and purified by a reverse osmosis membrane to an electric conductivity of 2 mS/cm. The purified dispersion was further concentrated to a pigment concentration of 15% by weight to prepare dispersion 4.

The average particle diameter of the pigment in the dispersion was measured with a particle size distribution measuring apparatus Microtrac UPA 150 (manufactured by Microtrac) and was found to be 130 nm.

Preparation of Resin Particles

Emulsions containing resin particles as dispersed particles were prepared by the following methods.

Preparation of Emulsion 1

Ion-exchanged water (900 g) and 3 g of sodium lauryl sulfate were charged into a reaction vessel equipped with a stirrer, a reflux condenser, a dropping device, and a thermometer. The temperature of the contents was raised to 70° C. with stirring while replacing the air in the reaction vessel by nitrogen. While maintaining the internal temperature at 70° C., 4 g of potassium persulfate was added as a polymerization initiator and dissolved in the contents of the reaction vessel. An emulsion previously prepared by adding 20 g of acrylamide, 300 g of styrene, 640 g of butylacrylate, and 30 g of methacrylic acid to 450 g of ion-exchanged water and 3 g of sodium lauryl sulfate with stirring was then continuously added dropwise to the reaction solution over a period of 4 hr. After the completion of the dropwise addition, the mixture was ripened for 3 hr. The aqueous emulsion thus obtained was cooled to room temperature. The cooled aqueous emulsion was then adjusted to solid content 40% by weight and pH 8 by the addition of ion-exchanged water and a 5% aqueous sodium hydroxide solution. Thus, emulsion 1 was prepared.

Emulsion 1 thus obtained was confirmed to be brought to a film at an indoor ambient temperature of about 20° C., and the glass transition temperature was measured by a differential thermal analysis with thermal analysis equipment SSC 5000 (manufactured by Seiko Instruments Inc.) and was found to be −15° C. The average particle diameter of emulsion 1 was measured with a particle size distribution measuring apparatus Microtrac UPA 150 (manufactured by Microtrac) and was found to be 110 nm.

Preparation of Emulsion 2

Ion-exchanged water (900 g) and 1 g of sodium lauryl sulfate were charged into a reaction vessel equipped with a stirrer, a reflux condenser, a dropping device, and a thermometer. The temperature of the contents was raised to 70° C. with stirring while replacing the air in the reaction vessel by nitrogen. While maintaining the internal temperature at 70° C., 4 g of potassium persulfate was added as a polymerization initiator and dissolved in the contents of the reaction vessel. An emulsion previously prepared by adding 20 g of acrylamide, 365 g of styrene, 545 g of butylacrylate, and 30 g of methacrylic acid to 450 g of ion-exchanged water and 3 g of sodium lauryl sulfate with stirring was then continuously added dropwise to the reaction solution over a period of 4 hr. After the completion of the dropwise addition, the mixture was ripened for 3 hr. The aqueous emulsion thus obtained was cooled to room temperature. The cooled aqueous emulsion was then adjusted to solid content 40% by weight and pH 8 by the addition of ion-exchanged water and an aqueous sodium hydroxide solution. Thus, emulsion 2 was prepared.

Emulsion 2 thus obtained was confirmed to be brought to a film at an indoor ambient temperature of about 20° C., and the glass transition temperature was measured by a differential thermal analysis with thermal analysis equipment SSC 5000 (manufactured by Seiko Instruments Inc.) and was found to be −6° C. The average particle diameter of emulsion 2 was measured with a particle size distribution measuring apparatus Microtrac UPA 150 (manufactured by Microtrac) and was found to be 200 nm.

Preparation of Emulsion 3

Ion-exchanged water (900 g) and 1 g of sodium lauryl sulfate were charged into a reaction vessel equipped with a stirrer, a reflux condenser, a dropping device, and a thermometer. The temperature of the contents was raised to 70° C. with stirring while replacing the air in the reaction vessel by nitrogen. While maintaining the internal temperature at 70° C., 4 g of potassium persulfate was added as a polymerization initiator and dissolved in the contents of the reaction vessel. An emulsion previously prepared by adding 20 g of acrylamide, 615 g of styrene, 295 g of butylacrylate, and 30 g of methacrylic acid to 450 g of ion-exchanged water and 3 g of sodium lauryl sulfate with stirring was then continuously added dropwise to the reaction solution over a period of 4 hr. After the completion of the dropwise addition, the mixture was ripened for 3 hr. The aqueous emulsion thus obtained was cooled to room temperature. The cooled aqueous emulsion was then adjusted to solid content 40% by weight and pH 8 by the addition of ion-exchanged water and an aqueous sodium hydroxide solution. Thus, emulsion 3 was prepared.

Emulsion 3 thus obtained was confirmed not to be brought to a film at an indoor ambient temperature of about 20° C., and the glass transition temperature was measured by a differential thermal analysis with thermal analysis equipment SSC 5000 (manufactured by Seiko Instruments Inc.) and was found to be 36° C. The average particle diameter of emulsion 3 was measured with a particle size distribution measuring apparatus Microtrac UPA 150 (manufactured by Microtrac) and was found to be 110 nm.

Preparation of Emulsion 4

Ion-exchanged water (900 g) and 3 g of sodium lauryl sulfate were charged into a reaction vessel equipped with a stirrer, a reflux condenser, a dropping device, and a thermometer. The temperature of the contents was raised to 70° C. with stirring while replacing the air in the reaction vessel by nitrogen. While maintaining the internal temperature at 70° C., 4 g of potassium persulfate was added as a polymerization initiator and dissolved in the contents of the reaction vessel. An emulsion previously prepared by adding 20 g of acrylamide, 675 g of methyl methacrylate, 235 g of butylacrylate, and 30 g of methacrylic acid to 450 g of ion-exchanged water and 3 g of sodium lauryl sulfate with stirring was then continuously added dropwise to the reaction solution over a period of 4 hr. After the completion of the dropwise addition, the mixture was ripened for 3 hr. The aqueous emulsion thus obtained was cooled to room temperature. The cooled aqueous emulsion was then adjusted to solid content 40% by weight and pH 8 by the addition of ion-exchanged water and an aqueous sodium hydroxide solution. Thus, emulsion 4 was prepared.

Emulsion 4 thus obtained was confirmed not to be brought to a film at an indoor ambient temperature of about 20° C., and the glass transition temperature was measured by a differential thermal analysis with thermal analysis equipment SSC 5000 (manufactured by Seiko Instruments Inc.) and was found to be 50° C. The average particle diameter of emulsion 4 was measured with a particle size distribution measuring apparatus Microtrac UPA 150 (manufactured by Microtrac) and was found to be 180 nm.

Preparation of Black Ink Compositions

Ingredients indicated in Table 1 were mixed together, and the mixture was stirred at room temperature for 2 hr and was then filtered through a stainless steel filter having a pore diameter of about 5 μm to prepare water-based black ink compositions of Examples 1 and 2 and Comparative Example 3. All the amounts of the ingredients added indicated in Table 1 are in % by weight, and the amounts of the pigment dispersion and the resin dispersion added are expressed in terms of solid content.

TABLE 1

|  | Black ink 1 | Black ink 2 | Black ink 3 (Comp. Ex.) |
|---|---|---|---|
| Pigment dispersion 1 | 40 | — | — |
| Pigment dispersion 2 | — | 45 | — |
| Pigment dispersion 3 | — | — | 40 |
| Emulsion 1 | 5 | — | — |
| Emulsion 2 | — | 5 | — |
| Emulsion 3 | 5 | — | — |
| Emulsion 4 | — | 5 | — |
| Glycerin | 10 | 13 | 10 |
| Triethylene glycol | — | 2 | — |
| Tetraethylene glycol | 5 | — | 5 |
| 2-Pyrrolidone | 2 | 3 | 2 |
| Triethylene glycol monobutyl ether | 5 | 1 | 5 |
| 1,2-Hexanediol | — | 3 | — |
| Surfynol 440 | 1.5 | — | 1.5 |
| Surfynol 465 | — | 1 | — |
| Surfynol TG | — | 1 | — |
| Tripropanolamine | 1 | 1 | 1 |
| Ultrapure water | Balance | Balance | Balance |

In the table, numerical values are in % by weight.

Chromatic Color Ink Compositions

Preparation of Polymer (I)

The air in a reaction vessel equipped with a stirrer, a thermometer, a reflux tube, and a dropping funnel was replaced by nitrogen. Styrene (30 parts), 10 parts of α-methylstyrene, 15 parts of butyl methacrylate, 10 parts of lauryl methacrylate, 2 parts of acrylic acid, and 0.3 part of t-dodecylmercaptan were then charged into the reaction vessel, and the contents of the reaction vessel were heated to 70° C. Styrene (150 parts), 15 parts of acrylic acid, 50 parts of butyl methacrylate, 1 part of t-dodecylmercaptan, 20 parts of methyl ethyl ketone, and 3 parts of azobisisobutyronitrile which had been separately provided were placed in the dropping funnel and were added dropwise to the reaction vessel over a period of 4 hr for polymerization of dispersed polymer. Further, methyl ethyl ketone was added to the reaction vessel to prepare a polymer solution having a concentration of 50% by weight.

Polymer was extracted from the polymer solution thus obtained and was measured for acid value by a neutralization titration method and for average molecular weight by GPC. As a result, it was found that the acid value was 55 KOH mg/g and the average molecular weight was 35,000.

Preparation of Pigment Dispersions

Yellow Dispersion I

A polymer particle dispersion containing a yellow pigment was prepared as follows. Specifically, 50 parts of polymer (I) solution prepared above, 75 parts of C.I. Pigment Yellow 74, 27.5 parts of a 0.05 wt % aqueous sodium hydroxide solution, and 60 parts of methyl ethyl ketone were mixed together, and the mixture was stirred with a homogenizer for 30 min. Thereafter, 300 parts of ion-exchanged water was added, and the mixture was further stirred for one hr. The whole amount of methyl ethyl ketone and a part of water were removed by evaporation by using a rotary evaporator, and the residue was then filtered through a 0.3-μm membrane filter to prepare yellow dispersion 1 having a solid content of 20% by weight.

Magenta Dispersion I

A polymer particle dispersion containing a magenta pigment was prepared in the same manner as in the yellow dispersion, except that 80 parts of C.I. Pigment Red 122 as a pigment and 40 parts of a polymer (I) solution were used.

Cyan Dispersion I

A polymer particle dispersion containing a cyan pigment was prepared in the same manner as in the yellow dispersion, except that 50 parts of C.I. Pigment Blue 15:4 as a pigment and 100 parts of a polymer (I) solution were used.

Preparation of Chromatic Color Ink Compositions

Yellow dispersion I, magenta dispersion I, or cyan dispersion I, solvents, and ultrapure water were mixed together according to formulations specified in Table 2 below, and the mixtures were stirred for 2 hr. Subsequently, the mixtures were filtered through Membrane Filter (tradename) (manufactured by NIHON MILLIPORE, LTD.) having a pore diameter of about 1.2 μm to prepare color inks. In Table 2, the amounts of the ingredients added are in % by weight.

TABLE 2

|  | Chromatic color inks | | | | | |
|---|---|---|---|---|---|---|
|  | Yellow A1 | Yellow A2 | Magenta A1 | Magenta A2 | Cyan A1 | Cyan A2 |
| Dispersion | 40 | 40 | 38 | 38 | 40 | 40 |
| Glycerin | 20 | 20 | 20 | 20 | 20 | 20 |
| Triethylene glycol | 4 | 2 | 4 | 2 | 4 | 2 |
| Trimethylol propane | — | 8 | — | 8 | — | 8 |
| 2-Pyrrolidone | 2 | 4 | 2 | 4 | 2 | 4 |
| Triethylene glycol monobutyl ether | 5 | 1 | 5 | 1 | 5 | 1 |
| 1,2-Hexanediol | — | 3 | — | 3 | — | 3 |
| Surfynol 465 | 1 | 0.2 | 1 | 0.1 | 1 | 0.1 |
| Surfynol TG | 0.5 | 0.6 | 0.2 | 0.6 | 0.1 | 0.6 |
| Ultrapure water | Balance | Balance | Balance | Balance | Balance | Balance |

In the table, numerical values are in % by weight.

Preparation of Ink Sets

The black, yellow, magenta, and cyan inks prepared above were combined as shown in the following table to prepare ink sets.

Ink sets 1 and 2, the black ink was a surface treatment-type black pigment ink composition, and, in ink set 3, the black ink was a polymer dispersion-type black pigment ink composition.

TABLE 3

|  | Black | Yellow | Magenta | Cyan |
|---|---|---|---|---|
| Ink set A1 | 1 | A1 | A1 | A1 |
| Ink set A2 | 2 | A2 | A2 | A2 |
| Ink set A3 (Comparative Example) | 3 | A1 | A1 | A1 |

Print Quality Evaluation Test

For the above ink sets, a 255-gradation full-color chart as a printed image was printed with a resolution of 720 dpi by a printer EM-930C (manufactured by Seiko Epson Corporation). In this case, YMC dot data, in which R240, G180, and B200 were replaced by a black ink, were prepared, and printing was carried out according to the dot data. Xerox 4024 (manufactured by Xerox Corp.) was used as recording paper.

The print quality of the prints thus obtained were evaluated. In the evaluation of the print quality, the prints were tested for white spots, color bleeding, and color reproduction, and judgment was carried out as follows.

Test 1: White Spots

The prints were observed visually and under a microscope, and the results were evaluated according to the following criteria. The microscopic examination was carried out with a microscope BHZ-UMA (manufactured by Olympus Optical Co., LTD.) at a magnification of 50 times.

The term "white spots" as used herein means spotted blank space parts in the print which have remained unprinted as observed visually or microscopically.

Grade A: Observation under a microscope does not indicate the presence of white spots in the print.

Grade B: Observation under a microscope indicates the presence of white spots in the print, although visual inspection does not indicate the presence of white spots.

Grade C: Visual inspection indicates the presence of white spots in the print.

Test 2: Color Bleeding

The print was observed visually and microscopically for color bleeding, and the results were evaluated according to the following criteria. The microscopic examination was carried out with a microscope BHZ-UMA (manufactured by Olympus Optical Co., LTD.) at a magnification of 50 times.

Grade A: Observation under a microscope does not indicate color bleeding in the print.

Grade B: Observation under a microscope indicates the presence of color bleeding in the print, although visual inspection does not indicate color bleeding.

Grade C: Visual inspection indicates color bleeding in the print.

Test 3: Rubbing/Scratch Resistance

Rubbing/scratch resistance of the print was evaluated under the following conditions.

When 48 hr elapsed after printing, the rubbing/scratch resistance was evaluated using Sutherland Rub Tester according to JIS K 5701. The evaluation criteria were as follows.

Grade A: The colorant does not separate at all.

Grade B: The colorant slightly separated (less than 20% of the whole colorant).

Grade C: The colorant separated (not less than 20% and less than 80% based on the whole colorant).

Grade D: The colorant mostly separated (not less than 80% of the whole colorant separated).

Test 4: Color Reproduction

The color reproduction was evaluated by determining the color reproduction range by the following method.

At the outset, a color chart of 384 patches for color and 17 patches for gray was printed for each ink set, and, for the print, $L^*$, $a^*$, and $b^*$ were measured with Type Spectrolino manufactured by Gretag Macbeth. The color reproduction range was determined by dividing color space by $L^*$ value into 10 parts, determining $a^*b^*$ space region (values of $a^*$ and $b^*$) for each $L^*$ value, then calculating $a^*b^*$ space region for all the $L^*$ values, and determining $L^*a^*b^*$ color space volume (gammat value). The results were evaluated according to the following criteria.

Grade A: The size of the color reproduction range was not less than 300000.

Grade B: The size of the color reproduction range was not less than 200000 and less than 250000.

Evaluation C: The size of the color reproduction range was less than 200000.

The results were as shown in the table below.

TABLE 4

|  | print quality evaluation tests | | | |
|---|---|---|---|---|
|  | White spot | Color bleedig | Rubbing/scratch resistance | Color reproduction |
| Ink set A1 | A | A | A | A |
| Ink set A2 | A | A | A | A |
| Ink set A3 (Comparative Example) | C | B | A | C |

Polymer II

Monomers were provided according to the following formulation.

| | |
|---|---|
| Polypropylene glycol monomethacrylate (n = 9) (a compound of formula (I) wherein R' represents a methyl group and $R^2$ represents hydrogen; tradename: Blemmer PP-500, manufactured by NOF CORPORATION) | 15 wt % |
| Polyethylene glycol monomethacrylate (n = 23) (a compound of formula (IV) wherein m is 23, R' and R2 represent methyl; tradename: NK ESTER M230G, manufactured by Shin-Nakamura Chemical Co., Ltd.) | 10 wt % |
| Methacrylic acid | 14 wt % |
| Styrene monomer | 36 wt % |
| Styrene macromer (styrene-acrylonitrile copolymer macromer, styrene content: 75 wt %, number average molecular weight: 6,000, polymerizable functional group: methacryloyl group; tradename: AN-6, manufactured by TOAGOSEI Co., Ltd.) | 15 wt % |
| n-Butyl methacrylate | 10 wt % |

Methyl ethyl ketone (20 parts by weight), 0.03 part by weight of a polymerization chain transfer agent (2-mercaptoethanol), and 10% of the total amount of the monomers were charged into a reaction vessel and were mixed together. Thereafter, the air in the vessel was replaced by nitrogen gas. On the other hand, the remaining monomers, i.e., 90% of the monomers, were charged into the dropping device.

A polymerization chain transfer agent (0.27% by weight, 2-mercaptoethanol), 60% by weight of methyl ethyl ketone, and 2,2'-azobis(2,4-dimethylvaleronitrile) were then added to the dropping device, followed by mixing. Thereafter, the air in the dropping device was replaced by nitrogen gas.

The temperature of the mixture in the reaction vessel was raised to 65° C. in a nitrogen atmosphere with stirring, and the mixture in the dropping device was added dropwise to the reaction vessel over a period of 3 hr. Two hr after the completion of the dropwise addition at 65° C., a solution prepared by dissolving 0.3% by weight of 2,2'-azobis(2,4-dimethylvaleronitrile) in 5% by weight of methyl ethyl ketone was added thereto. The mixture was ripened at 65° C. for 2 hr and then at 70° C. for 2 hr to prepare a polymer solution.

The solvent was removed from a part of the polymer solution thus obtained by distillation under the reduced pressure, and the residue was dried to isolate the polymer.

The weight average molecular weight of the polymer was determined by gel permeation chromatography using polystyrene as a standard substance and using chloroform containing 1 mml/liter dodecyldimethylamine as a solvent and was found to be 70,000.

Preparation of Pigment Dispersion

Yellow dispersion II

A polymer particle dispersion containing a yellow pigment was prepared as follows. Specifically, polymer (II) solution prepared above was dissolved in methyl ethyl ketone to prepare a 50% solution. This solution (50 parts), 75 parts of C.I. Pigment Yellow 74, 300 parts of a 0.05% potassium hydroxide solution, and 60 parts of methyl ethyl ketone were mixed together, and the mixture was stirred with a homogenizer for 30 min. Thereafter, 300 parts of ion-exchanged water was added, and the mixture was further stirred for additional 2 hr. The whole amount of methyl ethyl ketone and a part of water were removed by evaporation by using a rotary evaporator, and the residue was then filtered through a 0.3 μm membrane filter to prepare yellow dispersion II having a solid content of 20% by weight.

Magenta Dispersion II

Magenta dispersion II as a polymer particle dispersion containing a magenta pigment was prepared in the same manner as in the yellow dispersion, except that 80 parts of C.I. Pigment Violet 19 as a pigment and 40 parts of 50% methyl ethyl ketone solution of polymer (II) were used.

Cyan Dispersion III

Cyan dispersion II as a polymer particle dispersion containing a cyan pigment was prepared in the same manner as in the yellow dispersion, except that 50 parts of C.I. Pigment Blue 15:4 as a pigment and 100 parts of 50% methyl ethyl ketone solution of polymer (II) were used.

Preparation of Chromatic Color Ink Compositions

Yellow dispersion II, magenta dispersion II, or cyan dispersion II, solvents, and ultrapure water were mixed together according to formulations specified in Table 5 below, and the mixtures were stirred for 2 hr. Subsequently, the mixtures were filtered through Membrane Filter (tradename) (manufactured by NIHON MILLIPORE, LTD.) having a pore diameter of about 1.2 μm to prepare color inks. In Table 5, the amounts of the ingredients added are in % by weight.

TABLE 5

|  | Chromatic color inks | | | | | |
| --- | --- | --- | --- | --- | --- | --- |
|  | Yellow B1 | Yellow B2 | Magenta B1 | Magenta B2 | Cyan B1 | Cyan B2 |
| Dispersion | 40 | 40 | 38 | 38 | 40 | 40 |
| Glycerin | 20 | 20 | 20 | 20 | 20 | 20 |
| Triethylene glycol | 4 | 2 | 4 | 2 | 4 | 2 |
| Trimethylol propane | — | 8 | — | 8 | — | 8 |
| 2-Pyrrolidone | 2 | 4 | 2 | 4 | 2 | 4 |
| Triethylene glycol monobutyl ether | 5 | 1 | 5 | 1 | 5 | 1 |
| 1,2-Hexanediol | — | 3 | — | 3 | — | 3 |
| Surfynol 465 | 1 | 0.2 | 1 | 0.1 | 1 | 0.1 |
| Surfynol TG | 0.5 | 0.6 | 0.2 | 0.6 | 0.1 | 0.6 |
| Ultrapure water | Balance | Balance | Balance | Balance | Balance | Balance |

In the table, numerical values are in % by weight.

Preparation of Ink Sets

The black, yellow, magenta, and cyan inks prepared above were combined as shown in the following table to prepare ink sets.

Ink sets 1 and 2, the black ink was a surface treatment-type black pigment ink composition, and, in ink set 3, the black ink was a polymer dispersion-type black pigment ink composition.

TABLE 6

|  | Black | Yellow | Magenta | Cyan |
| --- | --- | --- | --- | --- |
| Ink set B1 | 1 | B1 | B1 | B1 |
| Ink set B2 | 2 | B2 | B2 | B2 |
| Ink set B3 (Comparative Example) | 3 | B1 | B1 | B1 |

Evaluation Tests

For ink sets B1 and B2, print quality evaluation tests 1 to 4 described above were carried out. The results were as shown in the table below.

TABLE 7

|  | print quality evaluation tests | | | |
| --- | --- | --- | --- | --- |
|  | White spot | Color bleeding | Rubbing/scratch resistance | Color reproduction |
| Ink set B1 | A | A | A | A |
| Ink set B2 | A | A | A | A |
| Ink set B3 (Comparative Example) | C | B | A | C |

The invention claimed is:

1. An ink set comprising a black ink composition and at least one chromatic color ink composition, wherein
said black ink composition comprises a surface-treated pigment dispersible and/or dissolvable in water without any dispersant, two or more types of resin particles, and water as a main solvent,
at least one type of resin particles among the two or more types of resin particles have a film forming temperature below 0° C., and at least one type of resin particles among the two or more types of resin particles have a film forming temperature of 30° C. or above, and
said chromatic color ink composition comprises at least a pigment, a polymer, which includes said pigment and renders said pigment dispersible in the chromatic color ink composition, and water as a main solvent,
wherein said polymer contains hydrophobic and hydrophilic groups and is substantially insoluble in the chromatic color ink composition, or said polymer is a vinyl polymer prepared by polymerizing
A) 5 to 45% by weight of at least one monomer selected from monomer A1 represented by formula (I):

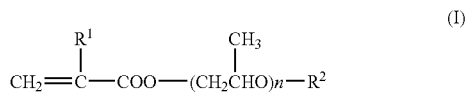

wherein $R^1$ represents a hydrogen atom or a methyl group, $R^2$ represents a hydrogen atom or an alkyl group having 1 to 20 carbon atoms, and n is 1 to 30,
monomer A2 represented by formula (II):

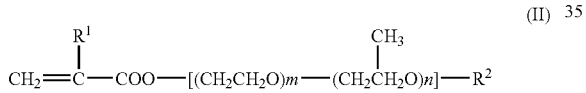

wherein $R^1$, $R^2$, and n are as defined in formula (I), m is 1 to 30, and the oxyethylene groups and the oxypropylene groups within [ ] may be added to each other as blocks or randomly, and
monomer A3 represented by formula (III):

wherein $R^1$, $R^2$, and n are as defined in formula (I),
B) 3 to 40% by weight of a monomer containing a salt forming group,
C) 5 to 40% by weight of a macromonomer having a number average molecular weight of 500 to 500,000, and
D) 0 to 87% by weight of a monomer copolymerizable with monomers A), B), and C).

2. The ink set according to claim 1, wherein said surface-treated pigment is produced by oxidizing a pigment with a hypohalous acid and/or a hypohalite or by oxidizing a pigment with ozone.

3. The ink composition according to claim 1, wherein said black ink composition contains 1 to 15% by weight, based on the total amount of the black ink composition, of said surface-treated pigment.

4. The ink set according to claim 1, wherein said at least one type of said resin particles is added, to said black ink composition, in the form of an emulsion produced by emulsion which is polymerization of an unsaturated monomer and/or a crosslinkable monomer in an aqueous medium.

5. The ink set according to claim 1, wherein said resin particles have an average particle diameter of 50 to 250 nm.

6. The ink set according to claim 1, wherein said black ink composition contains 0.5 to 10% by weight, based on the total amount of the black ink composition, of said at least two types of resin particles.

7. The ink set according to claim 1, wherein said black ink composition further comprises a water-soluble organic solvent and/or a surfactant.

8. The ink set according to claim 7, wherein said water-soluble organic solvent is selected from the group consisting of polyhydric alcohols, glycol butyl ethers, pyrrolidone, and mixtures thereof, and said surfactant is an acetylene glycol surfactant.

9. The ink set according to claim 1, wherein said black ink composition further comprises a pH adjustor selected from the group consisting of hydroxides of alkali metals, ammonia, triethanolamine, tripropanolamine, and mixtures thereof.

10. The ink set according to claim 1, wherein the content of said pigment in said chromatic color ink composition is 0.5 to 10% by weight based on the total amount of the chromatic color ink composition.

11. The ink set according to claim 1, wherein said chromatic color ink composition further comprises at least one member selected from the group consisting of water-soluble organic solvents, surfactants, 1,2-alkanediols, and mixtures thereof.

12. The ink set according to claim 11, wherein
said water-soluble organic solvent is a glycol mono-n-butyl ether,
said surfactant is an acetylene glycol surfactant, and
said 1,2-alkanediol is selected from the group consisting of 1,2-butanediol, 1,2-pentanediol, 1,2-hexanediol, 1,2-heptanediol, and mixtures thereof.

13. The ink set according to claim 1, wherein said chromatic color ink composition comprises at least two chromatic color ink compositions that, when used in combination, can realize achromatic color printing.

14. The ink set according to claim 1, wherein said chromatic color ink composition comprises a cyan ink composition, a magenta ink composition, and a yellow ink composition.

15. The ink set according to claim 1, wherein said chromatic color ink composition comprises two cyan ink compositions different from each other in color density, two magenta ink compositions different from each other in color density, and a yellow ink composition.

16. The ink set according to claim 1, for use in a recording method which comprises depositing ink compositions onto a recording medium to perform printing.

17. An ink jet recording method comprising the step of ejecting and depositing droplets of ink compositions onto a recording medium to perform printing, wherein
said ink compositions are a black ink composition and at least two chromatic color ink compositions that, when used in combination, can realize achromatic color printing,
said black ink composition comprises a surface-treated pigment dispersible and/or dissolvable in water without any dispersant, two or more types of resin particles, and water as a main solvent, at least one type of resin particles among the two or more types of resin particles have a film forming temperature below 0° C., and at least one type of resin particles among the two or more types of resin particles have a film forming temperature of 30° C. or above, and said chromatic color ink composition comprises at least a pigment, a polymer, which includes said pigment and renders said pigment dispersible in the chromatic color ink composition, and water as a main solvent, wherein said polymer contains hydrophobic and hydrophilic groups and is substantially insoluble in the chromatic color ink composition, or said polymer is a vinyl polymer prepared by polymerizing A) 5 to 45% by weight of at least one monomer selected from monomer A1 represented by formula (I):

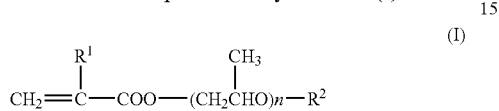

wherein $R^1$ represents a hydrogen atom or a methyl group, $R^2$ represents a hydrogen atom or an alkyl group having 1 to 20 carbon atoms, and n is 1 to 30, monomer A2 represented by formula (II):

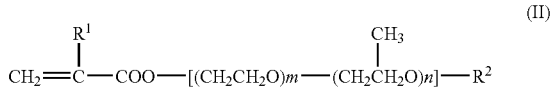

wherein $R^1$, $R^2$, and n are as defined in formula (I), m is 1 to 30, and the oxyethylene groups and the oxypropylenes group within [ ] may be added to each other as blocks or randomly, and monomer A3 represented by formula (III):

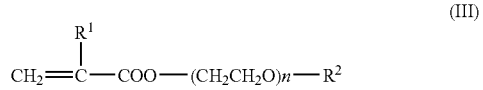

wherein $R^1$, $R^2$, and n are as defined in formula (I),

B) 3 to 40% by weight of a monomer containing a salt forming group,

C) 5 to 40% by weight of a macromonomer having a number average molecular weight of 500 to 500,000, and D) 0 to 87% by weight of a monomer copolymerizable with monomers A), B), and C), and when ink dots printed by a combination of said chromatic color ink compositions are an achromatic color or a chromatic color having a low lightness, ink dots are printed by ejecting said black ink composition instead of the combination of said chromatic color ink compositions.

18. An ink jet recording method comprising (a) providing the ink set according to claim 1 and (b) ejecting and depositing droplets of the black ink composition and the chromatic ink composition onto a recording medium to perform printing.

19. A record produced by the method according to claim 17.

20. The ink set according to claim 1, wherein the two or more types of resin particles do not include urethane resins.

* * * * *